US012236328B2

(12) United States Patent
Bostick et al.

(10) Patent No.: US 12,236,328 B2
(45) Date of Patent: *Feb. 25, 2025

(54) COGNITIVE COMMUNICATION ASSISTANT SERVICES

(71) Applicant: Kyndryl, Inc., New York, NY (US)

(72) Inventors: James E. Bostick, Cedar Park, TX (US); Danny Y. Chen, Austin, TX (US); Sarbajit K. Rakshit, Kolkata (IN); Keith R. Walker, Austin, TX (US)

(73) Assignee: Kyndryl, Inc., New York, NY (US)

( * ) Notice: Subject to any disclaimer, the term of this patent is extended or adjusted under 35 U.S.C. 154(b) by 1321 days.

This patent is subject to a terminal disclaimer.

(21) Appl. No.: 15/820,974

(22) Filed: Nov. 22, 2017

(65) Prior Publication Data

US 2018/0365552 A1 Dec. 20, 2018

Related U.S. Application Data

(63) Continuation of application No. 15/626,362, filed on Jun. 19, 2017, now Pat. No. 11,429,833.

(51) Int. Cl.
*G06N 3/006* (2023.01)
*G06F 16/9535* (2019.01)
*G06N 5/02* (2023.01)
*G06N 5/04* (2023.01)
*G06N 20/00* (2019.01)

(52) U.S. Cl.
CPC .......... *G06N 3/006* (2013.01); *G06F 16/9535* (2019.01); *G06N 5/02* (2013.01); *G06N 20/00* (2019.01); *G06N 5/04* (2013.01)

(58) Field of Classification Search
CPC .......... G06N 3/006; G06N 5/02; G06N 20/00; G06N 5/04; G06N 5/022; G06F 16/9535
See application file for complete search history.

(56) References Cited

U.S. PATENT DOCUMENTS

| 8,348,839 | B2 | 1/2013 | Sharda et al. | |
|---|---|---|---|---|
| 8,676,730 | B2* | 3/2014 | Ghani | G06N 20/10 706/12 |
| 2003/0126090 | A1* | 7/2003 | Fukuoka | G06Q 10/10 705/54 |
| 2008/0225870 | A1* | 9/2008 | Sundstrom | G06Q 10/10 370/401 |

(Continued)

FOREIGN PATENT DOCUMENTS

WO WO 2015023546 A1 2/2015

OTHER PUBLICATIONS

Mell, P., et al. "The NIST Definition of Cloud Computing," NIST Special Publication 800-145, Gaithersburg, MD (Sep. 2011).

(Continued)

*Primary Examiner* — Li B. Zhen
*Assistant Examiner* — Henry Nguyen
(74) *Attorney, Agent, or Firm* — CANTOR COLBURN LLP; Erik Swanson

(57) ABSTRACT

Methods, computer program products, and systems are presented. The methods include, for instance: obtaining communication data streams, extracting data relevant to a point of view of a user, and generating a point of view record in a knowledge base that may be utilized by another user communicating with the user.

17 Claims, 4 Drawing Sheets

(56) References Cited

U.S. PATENT DOCUMENTS

| | | | |
|---|---|---|---|
| 2015/0081725 A1* | 3/2015 | Ogawa | H04L 12/1859 |
| | | | 707/754 |
| 2015/0162020 A1 | 6/2015 | Deshmukh et al. | |
| 2015/0228281 A1 | 8/2015 | Raniere | |
| 2015/0382147 A1* | 12/2015 | Clark | H04W 4/025 |
| | | | 455/414.1 |
| 2016/0239478 A1 | 8/2016 | Rose Charvet et al. | |
| 2017/0118576 A1 | 4/2017 | Sharifi | |
| 2017/0220578 A1* | 8/2017 | Kazi | G06Q 50/01 |
| 2018/0061400 A1 | 3/2018 | Carbune et al. | |
| 2018/0196796 A1* | 7/2018 | Wu | G06F 40/289 |
| 2020/0082928 A1* | 3/2020 | Wu | G16H 80/00 |

OTHER PUBLICATIONS

Non-Final Office Action for U.S. Appl. No. 15/626,362, filed Jun. 19, 2017, dated May 26, 2020.

Applicant's Response to Non-Final Office Action for U.S. Appl. No. 15/626,362, filed Jun. 19, 2017, dated Jun. 30, 2020.

J. Bostick, et al. "Cognitive Communication Assistant Services", U.S. Appl. No. 15/626,362, filed Jun. 19, 2017.

List of IBM Patent and/or Patent Applications treated as related for U.S. Appl. No. 15/820,974, dated Nov. 22, 2017.

Non-Final Office Action for U.S. Appl. No. 15/626,362, filed Jun. 19, 2017, dated Feb. 23, 2021.

Kushal, D. "*Mining the Peanut Gallery: Opinion Extraction and Semantic Classification of Product Reviews,*" In proceedings of the International World Wide Web, 2003.

Spertus, E. "*Smokey: Automatic Recognition of Hostile Messages.*" In Proceedings of the Innovative Applications of Artificial Intelligence, 1997.

Read, J. "*Using Emoticons to Reduce Dependency in Machine Learning Techniques for Sentiment Classification,*" In Proceedings of the ACL Student Research Workshop, 2005.

\* cited by examiner

COGNITIVE COMMUNICATION ASSISTANT SERVICES

CROSS-REFERENCE TO RELATED APPLICATION

This application is a continuation of U.S. patent application Ser. No. 15/626,362, filed Jun. 19, 2017, entitled, "Cognitive Communication Assistance Services," the entirety of which is hereby incorporated herein by reference.

TECHNICAL FIELD

The present disclosure relates to cognitive computing and natural language processing technologies, and more particularly to methods, computer program products, and systems for providing communication assistant service for individuals and/or communication platforms.

BACKGROUND

Conventional telecommunication platforms facilitate remote interactions in various manners amongst people from all corners of the society. Messages exchanged through social media networks and online forums become a new kind of media channel in which many social and/or political issues are discussed.

SUMMARY

The shortcomings of the prior art are overcome, and additional advantages are provided, through the provision, in one aspect, of a method. The method for providing a communication assistant service to users of a communication instance includes, for example: obtaining, by one or more processor, one or more communication data stream in which a user of the users participates; extracting, by the one or more processor, data relevant to a point of view of the user from the communication data stream by use of at least one pre-trained point of view classifier; generating, by the one or more processor, one or more point of view record corresponding to the user based on the data from the extracting; and storing, by the one or more processor, the one or more point of view record from the generating in a knowledge base such that the one or more point of view record may be utilized by another user communicating with the user.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
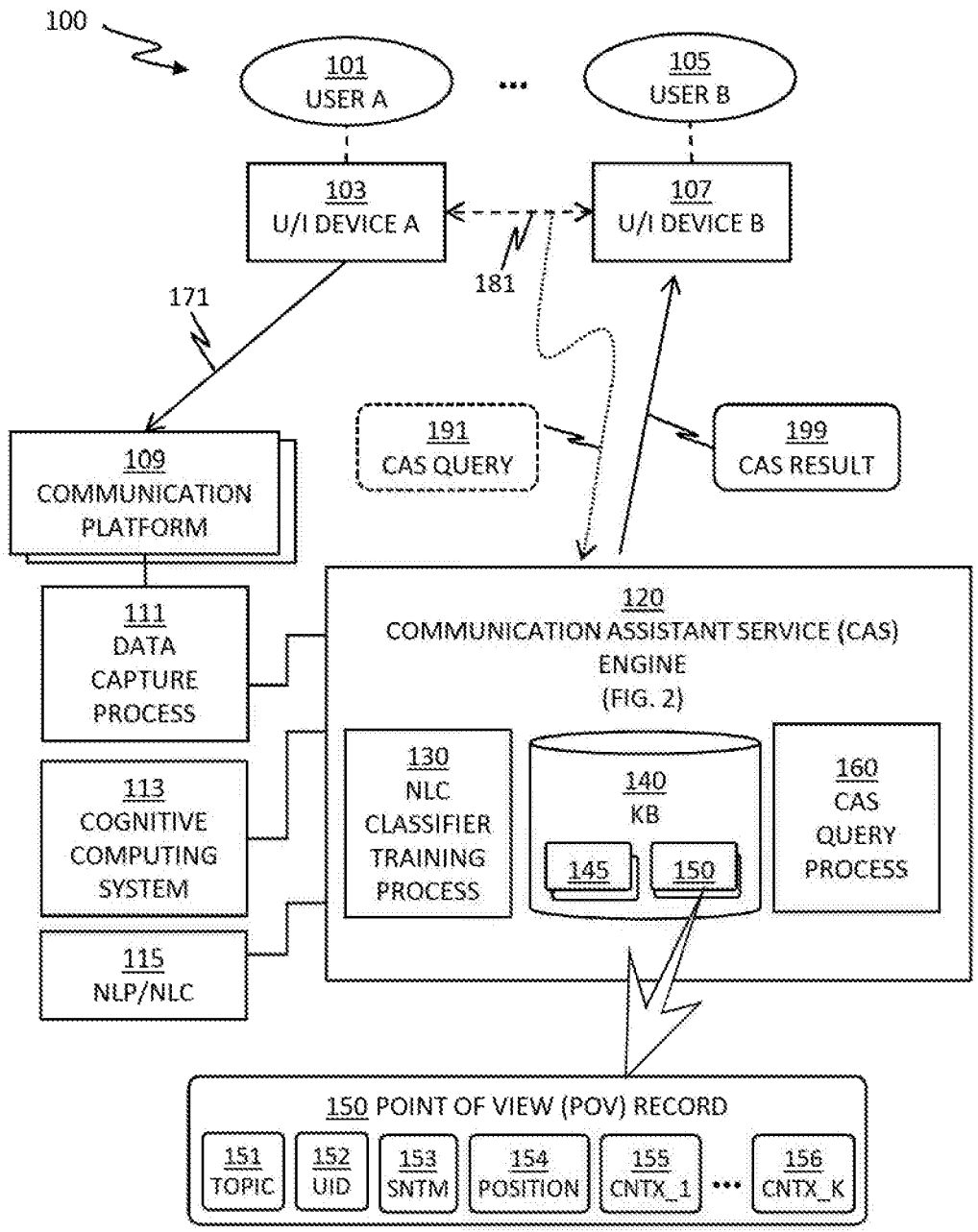
FIG. 1 depicts a system for providing communication assistant services for subscribed users, in accordance with one or more embodiments set forth herein.

FIG. 1 depicts a system 100 for providing communication assistant services for subscribed users, in accordance with one or more embodiments set forth herein.

Misunderstandings in communication may lead to discords in many types and severities, in personal relationships as well as for the society as a whole. As the number of remote interactions amongst people having wide range of relationships increases, as assisted by numerous communication platforms, the risk of misunderstandings in such remote interactions also increases. Examples of unfortunate outcomes of the misunderstandings in the remote interactions may include, but are not limited to, unfriending of a friend in a social media network after a heated dispute over a certain issue, flame wars in which unrelated participants exchange emotionally charged messages using disrespectful languages with one another in an online forum or the similar, instances of physically ill effects initiated by such discords in remote communications, etc. In some cases where such misunderstanding has been caused by a lack of information on disputed facts and/or the point of view held by the other party in the communication, such unfortunate outcomes of the misunderstandings may be prevented by providing the such information that may help the participants of the communication understand other participants better. Therefore, the system 100 offers a communication assistant service (CAS) that provides such information in real time to parties of subject communication, in order to minimize the probability of misunderstanding in communications.

The system 100 providing communication assistant services for two or more users includes a communication assistant service (CAS) engine 120 that is operationally coupled with one or more communication platform, a data capture process 111, a cognitive computing system 113, and a natural language processing (NLP) and natural language classification (NLC) tool 115.

User A 101 of the two or more users accesses a communication platform 109 of the one or more communication platform, as indicated by Arrow 171, by use of a user interface (U/I) device A 103. Examples of the U/I device A 103 may include, but are not limited to, a smartphone, a tablet, a laptop, a personal computer, an Internet of Things (IoT) device, etc. Examples of the communication platform 109 may include, but are not limited to, a social media network, a telecommunication service, a bulletin board/blog with comment/reply functionalities, etc. User A 101 creates a communication data stream represented by Arrow 171.

The CAS engine 120 includes a NLC classifier training process 130, a CAS query process 160, and a knowledge base (KB) 140. The NLC classifier training process 130 and the CAS query process 160 indicates respective functionalities of the CAS engine 120 and may or may not be implemented as separate processes.

The CAS engine 120 generates a content-topic tuple 145 of one or more content corresponding to at least one topics by use of the trained NLC classifiers and external tools 111, 113, 115 and stores the generated content-topic tuple 145 in the KB 140. The content-topic tuple 145 includes objective information related to the topic as gathered from numerous data sources, of which details are not presented in this specification. Based on communication data streams created by the two of more users, the CAS engine 120 generates one or more point of view record corresponding to respective topics and respective users by use of the trained NLC classifiers and the external tools 111, 113, 115 and stores generated one or more point of view (POV) record in the KB 140. A POV record 150 of the one or more POV record stored in the KB 140 may include attributes of Topic 151, User Identifier (UID) 152, Sentiment (SNTM) 153, Position 154, and one or more Context attribute 155, 156. The POV record 150 represents a point of view described as a value of the Position 154 of a user identified by a value of the UID 152 with on a topic specified as a value of the Topic 151. In the POV record 150, the CAS engine 120 may add a sentiment of the user of the UID 152 associated with the point of view of the Position 154, as represented by value of the Sentiment 153. Hereinafter in this specification, attribute names may indicate respective values of each attribute when used without distinction.

Arrow 181 indicates that User B 105 of the two or more users, by use of a user interface (U/I) device B 107, communicates with User A 101. A communication platform in which the communication instance between User A 101 and User B 105 is held may transfer the communication instance in real time to the CAS engine 120. In certain embodiments of the present invention wherein individual users subscribe to the CAS without engaging any communication platforms, the respective U/I devices of the individual users may directly transfer CAS eligible communication instances to the CAS engine 120, by use of a CAS agent program on the respective U/I devices, which is not depicted in FIG. 1.

Figure 2:
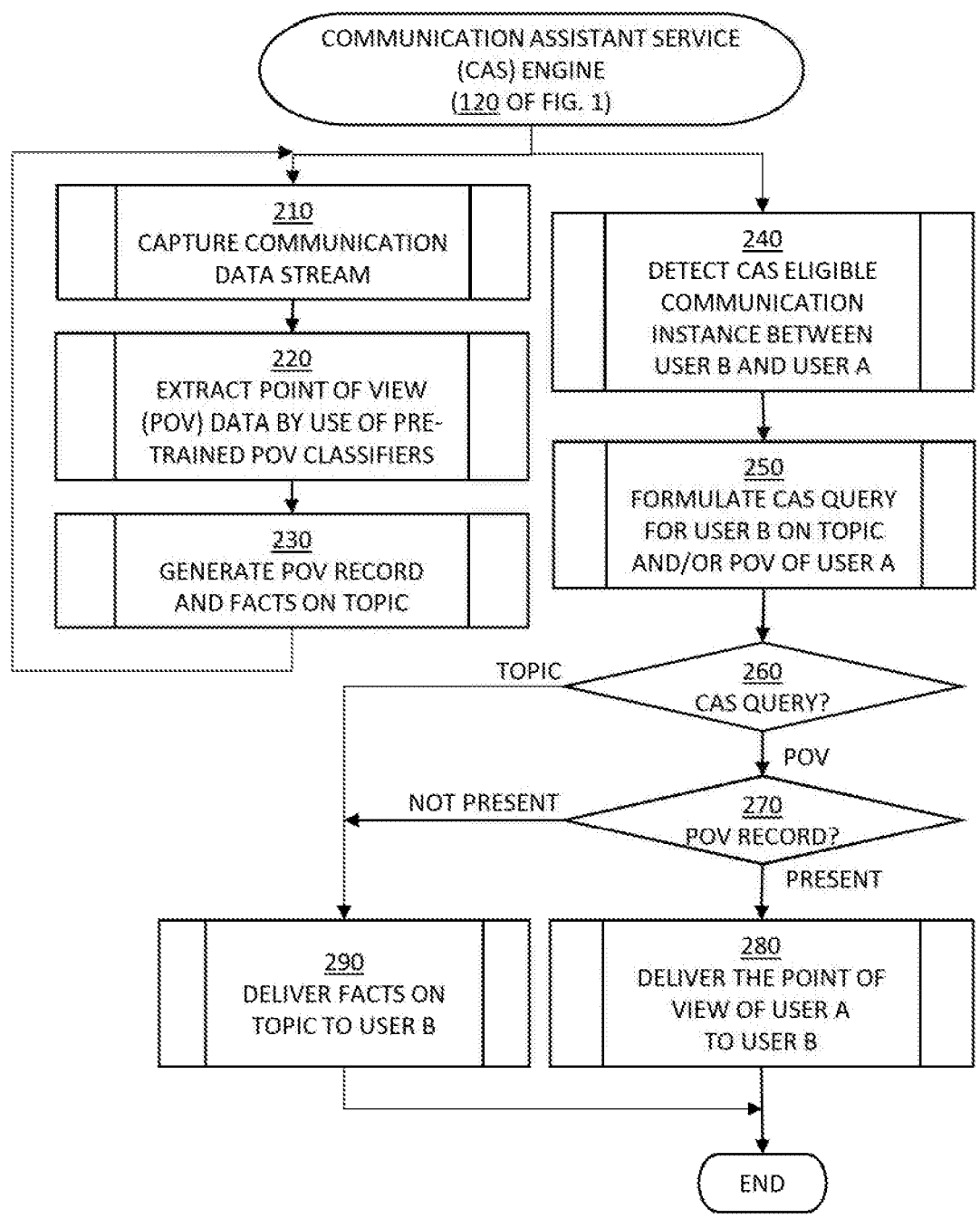
FIG. 2 depicts a flowchart performed by the communication assistant service (CAS) engine of the system, in accordance with one or more embodiments set forth herein.

The CAS engine 120 processes the communication instance between User A 101 and User B 105 according to the operations presented in FIG. 2 and corresponding descriptions. The CAS engine 120 may determine that the communication instance between User A 101 and User B 105 is eligible for the CAS based on analyzing the communication instance in real time by use of external tools 113, 115 along with the trained POV classifiers. The CAS engine 120 formulates a CAS query 191 for User B 105 based on content analysis of the communication instance. The CAS query 191 for User B 105 may be directed to facts of a topic being discussed in the communication instance, and/or the point of view of User A 101. The CAS engine 120 generates the CAS query 191 such that User B 105 may be most benefited in conducting the communication with User A 101, and vice versa. Similarly, the CAS engine 120 may generate respective CAS queries for all users participating in the communication in order to promote mutual understanding amongst all users. The CAS engine 120 generates a CAS result 199 responsive to the CAS query 191 and sends to User B 105 according to preconfigured delivery method corresponding to a mode of communication for the communication instance.

FIG. 2 depicts a flowchart performed by the communication assistant service (CAS) engine 120 of FIG. 1, in accordance with one or more embodiments set forth herein.

The CAS engine 120 may perform concurrently and/or independently blocks 210 through 230 and blocks 240 through 290, as respective units. In certain embodiments of the present invention, the CAS engine 120 performs blocks 210 through 230 periodically in order to keep point of view (POV) records up to date. The CAS engine 120 performs blocks 240 through 290 upon detecting a condition to render the communication assistant service (CAS) in block 240. Each block of the CAS engine 120 may or may not be implemented as separate processes, and the each block may include multiple operations.

In block 210, the CAS engine 120 captures communication data streams of users who may receive the communication assistant service (CAS). Examples of the captured communication data streams may be, but not limited to, postings and/or comments written by respective users on certain topics in various communication platforms. Then the CAS engine 120 proceeds with block 220.

In certain embodiments of the present invention, respective communication platforms subscribe for the CAS and, as a result, the CAS engine 120 captures communication data streams of the users via the subscribed communication platforms in order to provide the CAS result to the users of the respective communication platforms. In certain embodiments of the present invention, the CAS engine 120 may utilize stream data capturing tools available in the industry. In the same embodiments of the present invention, the CAS engine 120 may further utilize various natural language tools such as speech-to-text tools and/or automatic speech recognition tools that are available in the industry in order to capture communication data streams in various forms including audio/voice data as well as text data.

In block 220, the CAS engine 120 extracts point of views, positions/arguments, topics, and sentiments, respective to individual users from the communication data streams captured in block 210 by running the natural language processing and classification tools (NLP/NLC) with pre-trained Point of View (POV) classifiers. Prior to block 220, the CAS engine 120 specifies the POV classifiers and trains the NLP/NLC. Then the CAS engine 120 proceeds with block 220.

In certain embodiments of the present invention, the CAS engine 120 may automatically select the POV classifiers for training the NLC from other classifiers that may be used to describe a point of view such as assertions/opinions on certain issues, emotional states expressed in user comments, etc. The CAS engine 120 may utilize various cognitive computing tools such as a tone analyzer, personality analyzer, etc., such that various words describe respective intensity of sentiments, conviction on positions, and the frequency/number of times of expression of such sentiments and positions on a certain topic, voice stress levels in voice communication, biometric sensor inputs to optionally measure emotional states, etc., in order to provide contexts to the point of view.

In certain embodiments of the present invention, the CAS engine 120 may further integrate respective handling rules for certain selected POV classifiers. For example, wherein the CAS engine 120 specifies a set POV classifiers for abusive languages, the CAS engine 120 may associate a handling rule to replace words/phrases from the original communication to another words/phrases that is more polite and respectful while carrying the equivalent message. Similarly, wherein the CAS engine 120 specifies another set of POV classifiers including complex terms that are rarely used, the CAS engine 120 may associate another handling rule to replace the respective complex terms with simpler equivalents such that the recipient may understand the messages more easily.

In block 230, the CAS engine 120 generates one or more POV record based on the words/phrases extracted in block 220 as describing point of views by use of the POV classifiers. The CAS engine 120 generates the POV record based on distinctive tuples of user-topic, user-topic-sentiment, user-topic-position, and combinations thereof, along with one or more context attribute. The CAS engine 120 stores the generated POV record in the knowledgebase, along with content relevant to respective topics. The CAS engine 120 builds up contents respective to topics by gathering source documents from numerous data sources over time, by processing the source documents for topics, by associating content from the source documents classified as relevant to respective topics, and by storing the content per topic in the knowledgebase. Then the CAS engine 120 loops back to block 210 for updating of the communication data streams as configured with the CAS engine 120. Accordingly, the CAS engine 120 may run blocks 210 through 230 periodically, upon detecting an event to update any previously generated POV classifiers and/or POV record.

In certain embodiments of the present invention, the CAS engine 120 may generate the POV record as a tuple (Topic, UID, Sentiment, Position, context_1, . . . , context_k), indicating the POV record represents a point of view indicated by the instance of Position on the topic indicated by the instance of the Topic, as held by a user identified by the instance of the UID, with a sentiment indicated by the instance of the Sentiment, wherein "k" indicates a number of context attributes represented in the POV record. The Topic attribute of the POV record may be instantiated with a value selected from general subject matters as in news categories, or specific to a single issue, as trained by the POV classifiers. The UID attribute of the POV record may be instantiated with a value selected from user names, user identification numbers, etc., optionally combined with an identification for the communication platform in order to further distinguish the users according to the respective communication platforms. The Sentiment attribute of the POV record may be instantiated with a value selected from: positive, negative, or neutral. The Position attributed of the POV record may be instantiated with a value selected from: support, neutral, oppose, not interested.

In certain embodiments of the present invention, the POV record may have one or more context attribute, according to the value of "k". In certain embodiments of the present invention, the CAS engine 120 is configured to generate a POV record with four (k=4) context attributes including Timestamp, Location, EmotionalState, and CommunicationMode, wherein Timestamp has a value indicating date and time on which the communication data stream has been generated by a user of value (UID) on a topic of value (Topic), Location has a value indicating a geographical location where the communication data stream has been generated, EmotionalState has a value indicating an emotional state of the user of value (UID) as expressed in the communication data stream, and CommunicationMode indicates a preconfigured value indicating the mode of communication for the communication data stream. For example, the CAS engine 120 may configure EmotionalState to have a value selected from a preconfigured set of emotional states such as (excited, happy, sad, angry, frustrated), and CommunicationMode to have a value selected from (audio, text), or a list of communication platform names, etc. The CAS engine 120 may utilize any communication data streams accessible by the CAS engine 120 for the purpose of generating a POV record. Users generating a communication data stream and/or participating in communication data streams over a public communication platform may contribute to the POV records corresponding to the positions expressed in such communication data streams.

In certain embodiments of the present invention, the CAS engine 120 may be configured to run blocks 210 through 230 for a preconfigured threshold number of times before commencing operations of blocks 240 through 290, such that the CAS engine 120 may provide the POV record from the beginning. In certain embodiments of the present invention, the CAS engine 120 may commence the blocks 240 through 290 without building up the POV records but temporarily provide content relevant to a topic of a communication instance to the users engaged in the communication.

In block 240, the CAS engine 120 detects a communication instance that is eligible for the communication assistant service (CAS) amongst two or more parties, represented by User B and User A, by analyzing the communication instance in real time by use of NLP/NLC with the pretrained POV classifiers as in block 220. The CAS engine 120 may determine that the communication instance is eligible for the CAS if the parties to the communication instance, User B and User A, have access to the CAS individually. The CAS engine 120 may also determine that the communication instance is eligible for the CAS if the parties to the communication instance, User B and User A, had consented to use the CAS, wherein the CAS is provided via the communication platform by subscription. Then the CAS engine 120 proceeds with block 250.

In certain embodiments of the present invention, the communication platform may run an agent program of the CAS engine 120 that detects the communication instance eligible for the CAS based on a set of preconfigured keywords, etc., for efficiency. In the same embodiment of the present invention as depicted in FIG. 1, the CAS engine 120 has one or more POV record generated for the User A by running blocks 210 through 230, prior to performing block 240.

In block 250, the CAS engine 120 formulates one or more CAS query for one of the user on the topic of the communication instance and/or the point of view of another user participating in the communication instance based on analyzing the communication instance. The CAS engine 120 may formulate a CAS query for User B on content relevant to the topic such as facts, news articles, recent developments, expert opinions, diverse response on the topic, etc., on the topic, and ascertaining that User B wishes to know more about the topic. The CAS engine 120 may also formulate a CAS query for User B on the point of view of User A on the topic based on analyzing the communication instance and ascertaining that User B wishes to know more about how User A thinks of and/or feels for the topic. Then the CAS engine 120 proceeds with block 260.

In certain embodiments of the present invention, the CAS engine 120 may utilize various natural language processing/classifying tools, in formulating the CAS query such as a text parser, speech-to-text/automatic speech recognition on audio/voice data, etc. Some functionalities of NLP/NLC may be shared on the respective U/I device of the users participating in the communication instance.

In certain embodiments of the present invention, the CAS engine 120 may formulate a CAS query based on any questions/statements by the User B such as "What are you talking about?"; "What do you mean?"; "I have no clue."; "What's going on here?" etc., or based on processing a data stream of the communication instance wherein the User B demonstrates a lack of understanding in topics that had been previously discussed. In certain embodiments of the present invention, the CAS engine 120 may formulate respective CAS queries for each party in the communication instance, including a plurality of point of view queries for respective parties on respective point of views held by other parties in the communication instance.

In block 260, the CAS engine 120 determines the type of the CAS query formulated in block 250. If the CAS engine 120 determines that the CAS query for one user is on the point of view of another user, User A, then the CAS engine 120 proceeds with block 270. If the CAS engine 120 determines that the CAS query is on the objective facts of the topic, then the CAS engine 120 proceeds with block 290.

In block 270, the CAS engine 120 determines whether or not a point of view record of another user, User A, on the topic is presently available. If the CAS engine 120 determines that the point of view record of User A is present, then the CAS engine 120 proceeds with block 280. If the CAS engine 120 determines that the point of view record of User A is not present, then the CAS engine 120 proceeds with block 290.

In block 280, the CAS engine 120 delivers the CAS result including the point of view of another user, User A, to the user for which the CAS query had been formulated in block 250, User B, based on content of the point of view record of User A. The CAS result may further include a confidence weight associated with the point of view, indicating a likelihood of the point of view by User A being applicable for the communication instance as detected in block 240 above. The CAS engine 120 may examine respective values of the one or more context attribute of the point of view record associated with User A as stored in the knowledgebase in order to adjust confidence weight of the POV record. The CAS engine 120 facilitates User B with the point of view of User A with the adjusted confidence weight such that User B may understand User A better and conduct a more amicable communication which may not be likely without the CAS. Then the CAS engine 120 terminates processing the communication instance detected in block 240. The CAS engine 120 may loop back to block 240 for detecting another CAS eligible communication instance.

In the same embodiments as presented in block 230 above, the CAS engine 120 may be configured to generate each POV record with four (k=4) context attributes including Timestamp, Location, EmotionalState, and CommunicationMode. The CAS engine 120 may adjust the confidence weight associated with the POV record that has been discovered in block 270, based on the characteristics of the respective context attribute values, in order to determine if the point of view in the POV record is applicable based on the circumstance in which the user had expressed the point of view in the past.

For example, a POV record having a value of the Timestamp context attribute older than a certain threshold timeframe, say three-months, that may affect the point of view of a person, then, the CAS engine 120 may reduce the confidence weight of the POV record, or the Position on the Topic, by a preconfigured amount or a ratio proportional to an age of the POV record to inform the participants of the communication instance of the age of the POV record. For another example, the CAS engine 120 may compare circumstances of the communication instance as detected in block 240, such as Location and CommunicationMode, and the context attributes of the POV record that was discovered in block 270, and increase the confidence weight of the POV record upon ascertaining that the circumstances of the detected communication instance and the context attribute values of the discovered POV record are similar, based on that a user may express distinctive point of views from one context to another context and that it is more likely for a point of view to be more applicable if the context of the present communication instance is similar to the context of the communication data stream in which the point of view had been originally expressed.

In the same embodiments as above, the CAS engine 120 delivers the CAS result according to a delivery configuration consistent with a communication mode of the communication instance that is presently ongoing. For example, wherein the communication instance is a telephone conversation over an audio channel, then the CAS engine 120 delivers the CAS result by a voice over message audible only to the intended recipient of the communication. Similarly, wherein the communication instance is message exchanges in an online forum, then the CAS engine 120 delivers the CAS result by use of a pop-up window only on the screen of the U/I device of the intended recipient of the communication.

In block 290, the CAS engine 120 delivers the CAS result including the content on the topic, to the user for which the CAS query had been formulated in block 250, User B. The CAS engine 120 may be configured to deliver the content/facts on topic to User B for all CAS queries, even when the POV record of User A has been discovered, to ensure that User B is properly informed with objective information, the facts on the topic, as well as the point of view of User A who is another party in the communication instance. The CAS engine 120 may utilize the same delivery configurations as described in examples of block 280 above. The CAS engine 120 facilitates User B with the content relevant to the topic of the communication instance such that User B may understand the topic better and, based on the improved comprehension, conduct a more amicable communication with User A, which may not be likely without the CAS.

Similarly with the POV record in block 280, the CAS engine 120 may adjust confidence weights associated with the content on the topic, based on how frequently the topic is discussed, how recently the content has been cited, how reliable the source who reported the content is, the ratio of positive feedbacks on the content, etc., before and/or after the delivery of the content.

Then the CAS engine 120 terminates processing the communication instance detected in block 240. The CAS engine 120 may loop back to block 240 for detecting another CAS eligible communication instance.

In accordance with the operations depicted herein, the CAS engine 120 detects a chat between users "Alice" and "Bob" as a CAS eligible communication instance, when Alice commented on a certain behavioral phenomenon often observed in athletes, identified as "Opening Ceremony" by the POV classifier. Alice sends "why in the world they are doing this?", and Bob hesitates with a response because Bob does not know what to say. The CAS engine 120 formulates a CAS query for content on Opening Ceremony, and subsequently opens a pop-up window displaying a CAS result including facts and reasons of the Opening Ceremony on the screen of a smartphone of Bob, which Bob is using as a U/I device. By use of the CAS result, Bob may respond to Alice by explaining the reason of the Opening Ceremony and both Alice and Bob may have a better understanding on the Opening Ceremony, and the communication may progress smoothly.

Certain embodiments of the present invention may offer various technical computing advantages, including a provision of communication assistant service (CAS) for communication data streams. Communication data streams exchanged in subscribed communication platforms and/or subscribed users are analyzed by use of natural language processing and classification technologies. Point of view (POV) classifiers to extract information relevant to topics and point of views from the communication data streams are trained by use of machine learning. In real time, each communication instance is analyzed by use of the POV classifiers and a CAS query is formulated by natural language processing, and responded based on previously generated POV record and/or content relevant to a topic being discussed in a communication instance. Certain embodiments of the present invention improves communication efficiency and increases understanding on the topic and with one another in communication instances that may evolve into verbally abusive exchanges and/or even lead to physically ill effects. By use of multithreading and/or multiprocessing, the communication assistant services may be concurrently rendered for any number of users and/or communication platforms. Certain embodiments of the present invention may be implemented by use of a cloud platform/data center, and the communication assistant services may be provided as a subscribed service for individual users and the communication platforms.

Figure 3:
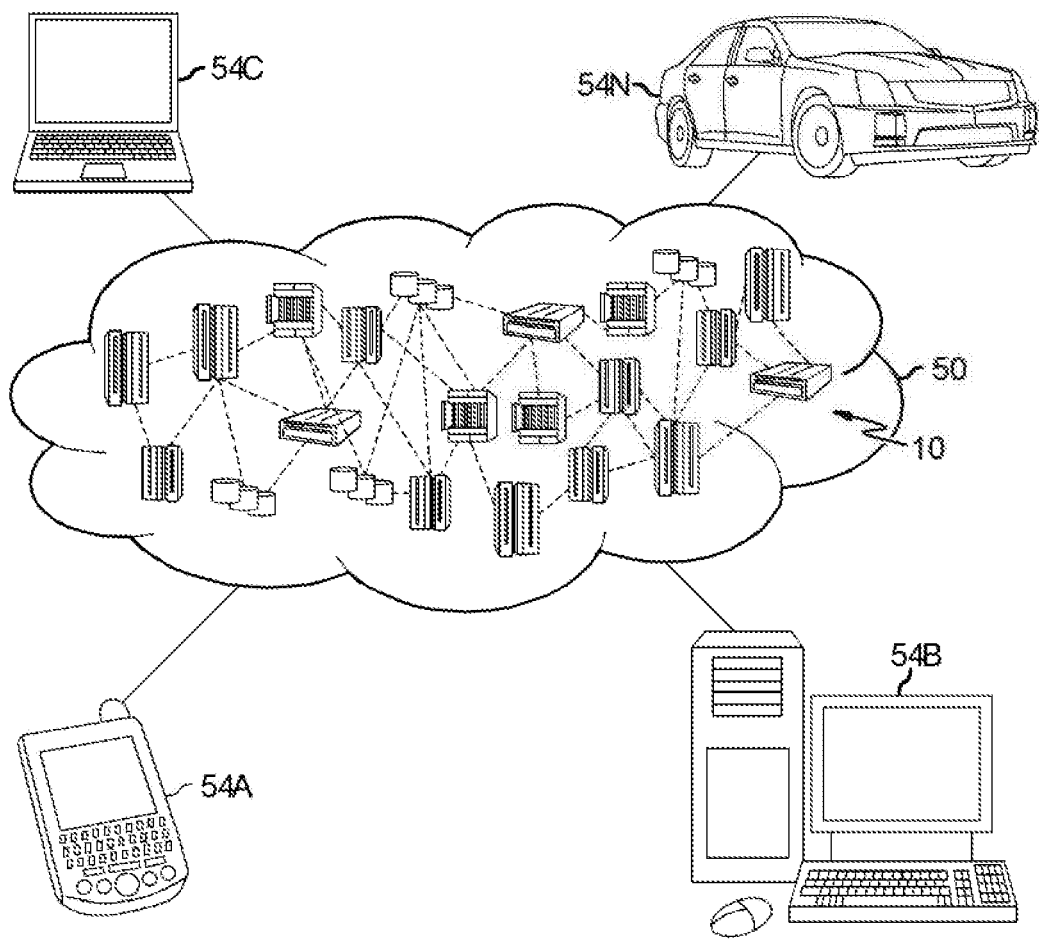
FIG. 3 depicts a cloud computing environment according to an embodiment of the present invention.
Figure 4:
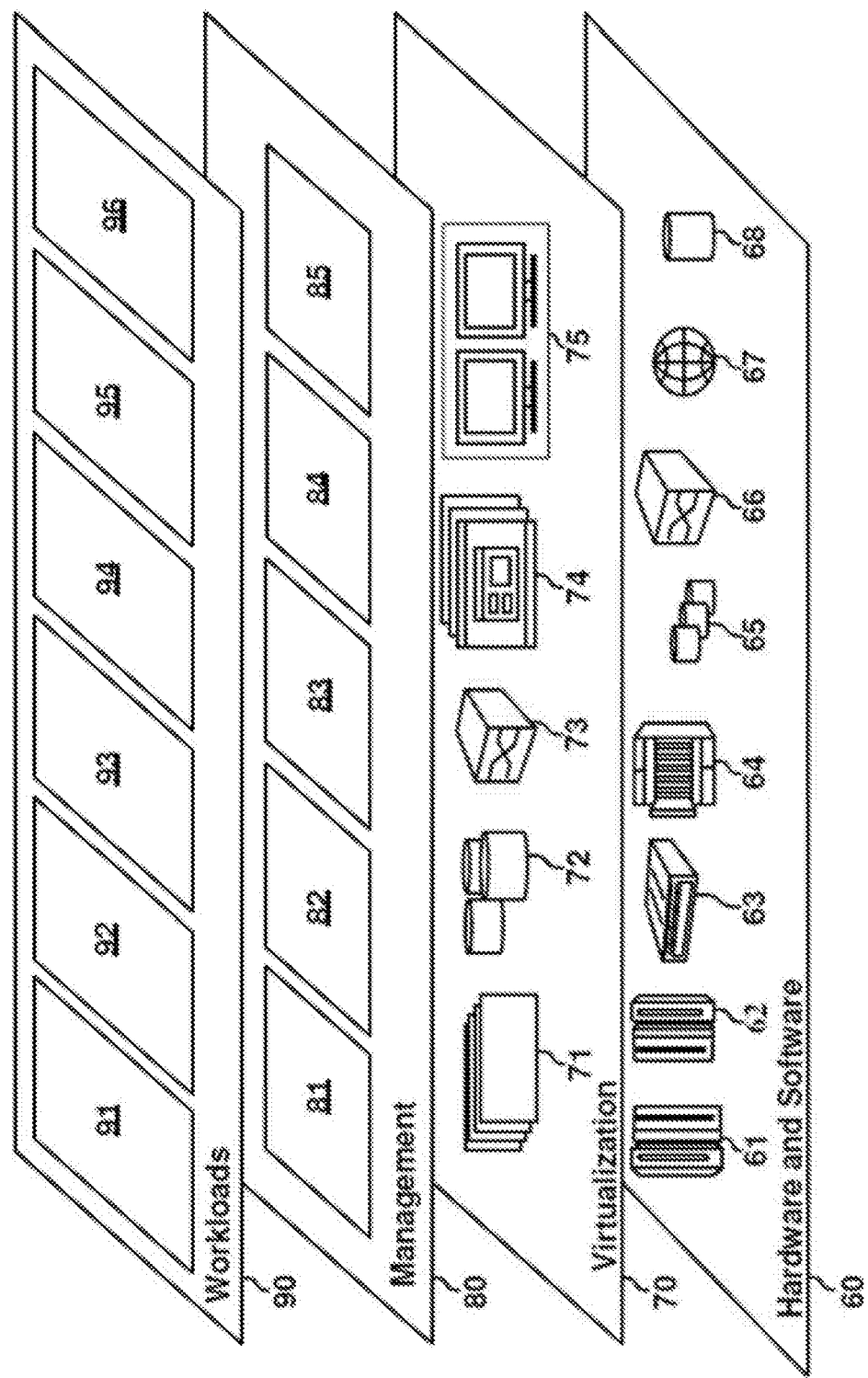
FIG. 4 depicts abstraction model layers according to an embodiment of the present invention.

FIGS. 3-4 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the communication assistant service (CAS) engine 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A system comprising:
a memory;
one or more processors in communication with the memory, wherein the one or more processors are configured to,
perform a method for providing a communication assistant service to users of a communication instance, the method comprising:
obtaining a communication data stream in which a user of the users participates;
extracting using natural language processing data relevant to a point of view of the user from the communication data stream by use of at least one pre-trained point of view classifier;
generating at least one point of view record of the user based on the data from the extracting, wherein generating includes generating a plurality of historical point of view records of the user responsive to the user and a second user
storing the at least one point of view record of the user from the generating in a knowledge base;
detecting a certain communication instance as being eligible for the communication assistant service, wherein the user and the second user of the users are human users participating in the certain communication instance at a time of the detecting, wherein the generating the at least one point of view record of the user includes generating a plurality of historical point of view records of the user prior to the certain communication instance involving the user and a second user; and
selectively delivering to the second user a certain communication assistant service communication in dependence on processing of the stored at least one point of view record of the user, wherein the processing of the stored at least one point of view record of the user includes processing the plurality of historical point of view records generated by the user generated prior to the certain communication, wherein the selectively delivering to the second user is performed while the second user and the user are participating in the certain communication instance, and performed responsively to a first query of the knowledge base, wherein the first query of the knowledge base is selectively performed responsively to an examining of communication content of the second user, wherein the knowledge base stores topic content according to multiple topics from processing a plurality of source documents associated with the multiple topics, wherein the selectively delivering to the second user a certain communication assistant service communication is performed responsively to a first query of the knowledge base, and wherein the first query of the knowledge base is selectively performed responsively to an examining of the communication content of the second user during the certain communication instance with use of natural language processing resulting in a determination that the second user wishes to know the point of view of the user; and further selectively delivering to the user a particular communication assistant service communication in dependence on processing of a plurality of historical point of view records generated by the second user prior to the certain communication instance based on communication data streams of the second user during historical communications of the second user, wherein the further selectively delivering to the user is performed while the second user and the user are participating in the certain communication instance, wherein the extracting using natural language processing data relevant to a point of view of the user from the communication data stream includes extracting a topic of the communication data stream to provide an extracted topic of the communication data stream, and determining a sentiment of the user in regard to the extracted topic of the communication data stream, wherein the selectively delivering to the second user the communication assistant service communication includes selectively delivering to the second user data indicating the sentiment of the user in regard to the extracted topic of the communication data stream, and wherein the determining a sentiment of the user in regard to the extracted topic has included processing historical data from data sources other than the communication data stream.

2. The system of claim 1, wherein the generating the at least one point of view record of the user includes generating one or more historical point of view record of the user prior to the certain communication instance involving the user and the second user, and wherein the processing of the stored at least one point of view record of the user includes processing the one or more historical point of view record of the user generated prior to the certain communication.

3. The system of claim 1, wherein the method includes further selectively delivering to the user the particular communication assistant service communication in dependence on processing of a plurality of historical point of view records of the second user generated prior to the certain communication instance based on communication data streams of the second user during historical communications of second user, wherein the further selectively delivering to the user is performed while the second user and the user are participating in the certain communication instance, wherein the further selectively delivering includes presenting the particular communication assistant service communication to the user without presenting the particular communication assistant service communication to the second user.

4. The system of claim 1 wherein the method includes further selectively delivering to the second user a second certain communication assistant service communication in dependence on processing of the stored topic content according to multiple topics, wherein the further selectively delivering to the second user is performed while the second user and the user are participating in the certain communication instance, wherein the further selectively delivering to the second user the second certain communication assistant service communication is performed responsively to a second query of the knowledge base.

5. The system of claim 4, wherein the second query of the knowledge base is selectively performed responsively to an examining of the communication content of the second user during the certain communication instance with use of natural language processing resulting in a determination that the second user wishes to know more about a certain topic.

6. The system of claim 5, wherein the further selectively delivering includes presenting the particular communication assistant service communication to the user without presenting the particular communication assistant service communication to the second user, wherein the further selectively delivering includes presenting the second certain communication assistant service communication to the second user without presenting the second certain communication assistant service communication to the user.

7. The system of claim 1, wherein the generating the at least one point of view record of the user includes generating at least one historical point of view record of the user prior to the certain communication instance involving the user and a second user, and wherein the processing of the stored at least one point of view record of the user includes processing the at least one historical point of view records of the user generated prior to the certain communication, wherein the method includes further selectively delivering to the user a particular communication assistant service communication in dependence on processing of at least one historical point of view record of the second user generated prior to the certain communication instance based on one or more communication data stream of the second user during at least one historical communication of the second user, wherein the further selectively delivering to the user is performed while the second user and the user are participating in the certain communication instance, wherein the extracting using natural language processing data relevant to a point of view of the user from the communication data stream includes extracting a topic of the communication data stream to provide an extracted topic of the communication data stream, and determining a sentiment of the user in regard to the extracted topic of the communication data stream, and wherein the selectively delivering to the second user the communication assistant service communication includes selectively delivering to the second user data indicating the sentiment of the user in regard to the extracted topic of the communication data stream, and wherein the determining a sentiment of the user in regard to the extracted topic has included processing historical data from at least one data source other than the communication data stream.

8. The system of claim 1, wherein the generating the at least one point of view record of the user includes generating at least one historical point of view record of the user prior to the certain communication instance involving the user and a second user, and wherein the processing of the stored at least one point of view record of the user includes processing the at least one historical point of view records of the user generated prior to the certain communication, wherein the method includes further selectively delivering to the user a particular communication assistant service communication in dependence on processing of at least one historical point of view record of the second user generated prior to the certain communication instance based on one or more communication data stream of the second user during at least one historical communication of the second user, wherein the further selectively delivering to the user is performed while the second user and the user are participating in the certain communication instance, wherein the extracting using natural language processing data relevant to a point of view of the user from the communication data stream includes extracting a topic of the communication data stream to provide an extracted topic of the communication data stream, and determining a sentiment of the user in regard to the extracted topic of the communication data stream, and wherein the determining a sentiment of the user in regard to the extracted topic has included processing historical data from at least one data source other than the communication data stream.

9. The system of claim 1, wherein the generating the at least one point of view record of the user includes generating at least one historical point of view record of the user prior to the certain communication instance involving the user and a second user, and wherein the processing of the stored at least one point of view record of the user includes processing the at least one historical point of view records of the user generated prior to the certain communication, wherein the extracting using natural language processing data relevant to a point of view of the user from the communication data stream includes extracting a topic of the communication data stream to provide an extracted topic of the communication data stream, and determining a sentiment of the user in regard to the extracted topic of the communication data stream, and wherein the selectively delivering to the second user the communication assistant service communication includes selectively delivering to the second user data indicating the sentiment of the user in regard to the extracted topic of the communication data stream, and wherein the determining a sentiment of the user in regard to the extracted topic has included processing historical data from at least one data source other than the communication data stream.

10. A system comprising:
a memory; and
one or more processors in communication with the memory, wherein the one or more processors are configured to,
perform a method for providing a communication assistant service to users of a communication instance, the method comprising:
obtaining a communication data stream in which a user of the users participates;
extracting using natural language processing data relevant to a point of view of the user from the communication data stream by use of at least one pre-trained point of view classifier;
generating at least one point of view record of the user based on the data from the extracting;
storing the at least one point of view record of the user from the generating in a knowledge base;
detecting a certain communication instance as being eligible for the communication assistant service, wherein the user and a second user of the users are human users participating in the certain communication instance at a time of the detecting, wherein the generating the at least one point of view record of the user includes generating a plurality of historical point of view records of the user prior to the certain communication instance involving the user and a second user; and
selectively delivering to the second user a certain communication assistant service communication in dependence on processing of the stored at least one point of view record of the user, wherein the processing of the stored at least one point of view record of the user includes processing the plurality of historical point of view records generated by the user prior to the certain communication, wherein the selectively delivering to the second user is performed while the second user and the user are participating in the certain communication instance, wherein the selectively delivering includes presenting the certain communication assistant service communication to the second user without presenting the certain communication assistant service communication to the user,
wherein the selectively delivering is performed responsively to a first query of the knowledge base, wherein the first query of the knowledge base is selectively performed responsively to an examining of communication content of the second user, and
wherein the method includes further selectively delivering to the user a particular communication assistant service communication in dependence on processing of a plurality of historical point of view records of the second user generated prior to the certain communication instance based on communication data streams of the second user during historical communications of the second user,
wherein the further selectively delivering to the user is performed while the second user and the user are participating in the certain communication instance,
wherein the knowledge base stores topic content according to multiple topics from processing a plurality of source documents associated with the multiple topics, wherein the selectively delivering to the second user a certain communication assistant service communication is performed responsively to a first query of the knowledge base, and
wherein the first query of the knowledge base is selectively performed responsively to an examining of the communication content of the second user during the certain communication instance with use of natural language processing resulting in a determination that the second user wishes to know the point of view of the user;
wherein the method includes further selectively delivering to the second user a second certain communication assistant service communication in dependence on processing of the stored topic content according to multiple topics,
wherein the further selectively delivering to the second user is performed while the second user and the user are participating in the certain communication instance,
wherein the further selectively delivering to the second user the second certain communication assistant service communication is performed responsively to a second query of the knowledge base, wherein the second query of the knowledge base is selectively performed responsively to an examining of communication content of the second user during the certain communication instance with use of natural language processing resulting in a determination that the second user wishes to know more about a certain topic, wherein the extracting using natural language processing data relevant to a point of view of the user from the communication data stream includes extracting a topic of the communication data stream to provide an extracted topic of the communication data stream, and determining a sentiment of the user in regard to the extracted topic of the communication data stream, and wherein the selectively delivering to the second user the communication assistant service communication includes selectively delivering to the second user data indicating the sentiment of the user in regard to the extracted topic of the communication data stream, and wherein the determining a sentiment of the user in regard to the extracted topic has included processing historical data from data sources other than the communication data stream.

11. The system of claim 10, wherein the generating the at least one point of view record of the user includes generating a plurality of historical point of view records of the user prior to the certain communication instance involving the user and a second user, and wherein the processing of the stored at least one point of view record of the user includes processing the plurality of historical point of view records of the user generated prior to the certain communication, wherein the method includes further selectively delivering to the user a particular communication assistant service communication in dependence on processing of a plurality of historical point of view records of the second user generated prior to the certain communication instance based on communication data streams of the second user during historical communications of the second user, wherein the further selectively delivering to the user is performed while the second user and the user are participating in the certain communication instance, wherein the further selectively delivering includes presenting the particular communication assistant service communication to the user without presenting the particular communication assistant service communication to the second user, wherein the extracting using natural language processing data relevant to a point of view of the user from the communication data stream includes extracting a topic of the communication data stream to provide an extracted topic of the communication data stream, and determining a sentiment of the user in regard to the extracted topic of the communication data stream, and wherein the selectively delivering to the second user the communication assistant service communication includes selectively delivering to the second user data indicating the sentiment of the user in regard to the extracted topic of the communication data stream, and wherein the determining a sentiment of the user in regard to the extracted topic has included processing historical data from data sources other than the communication data stream.

12. A system comprising:
a memory; and
one or more processors in communication with the memory, wherein the one or more processors are configured to, perform a method for providing a communication assistant service to users of a communication instance, the method comprising:

obtaining a communication data stream in which a user of the users participates;

extracting using natural language processing data relevant to a point of view of the user from the communication data stream by use of at least one pre-trained point of view classifier;

generating at least one point of view record of the user based on the data from the extracting;

storing the at least one point of view record of the user from the generating in a knowledge base; detecting a certain communication instance as being eligible for the communication assistant service, wherein the user and a second user of the users are human users participating in the certain communication instance at a time of the detecting, wherein the generating the at least one point of view record of the user includes generating a plurality of historical point of view records of the user prior to the certain communication instance involving the user and a second user; and delivering to the second user a certain communication assistant service communication in dependence on processing of the stored at least one point of view record of the user, wherein the delivering to the second user is performed while the second user and the user are participating in the certain communication instance, wherein the processing of the stored at least one point of view record of the user includes processing the plurality of historical point of view records of the user generated prior to the certain communication, wherein the knowledge base stores topic content according to multiple topics from processing a plurality of source documents associated with the multiple topics, wherein the selectively delivering to the second user a certain communication assistant service communication is performed responsively to a first query of the knowledge base, and wherein the first query of the knowledge base is selectively performed responsively to an examining of the communication content of the second user during the certain communication instance with use of natural language processing resulting in a determination that the second user wishes to know the point of view of the user, and further selectively delivering to the user a particular communication assistant service communication in dependence on processing of a plurality of historical point of view records of the second user generated prior to the certain communication instance based on communication data streams of the second user during historical communications of the second user, wherein the further selectively delivering to the user is performed while the second user and the user are participating in the certain communication instance, wherein the extracting using natural language processing data relevant to a point of view of the user from the communication data stream includes extracting a topic of the communication data stream to provide an extracted topic of the communication data stream, and determining a sentiment of the user in regard to the extracted topic of the communication data stream, wherein the selectively delivering to the second user the communication assistant service communication includes selectively delivering to the second user data indicating the sentiment of the user in regard to the extracted topic of the communication data stream, and wherein the determining a sentiment of the user in regard to the extracted topic has included processing historical data from data sources other than the communication data stream.

13. The system of claim 12, wherein the generating the at least one point of view record of the user includes generating at least one historical point of view record of the user prior to the certain communication instance involving the user and a second user, and wherein the processing of the stored at least one point of view record of the user includes processing the at least one historical point of view records of the user generated prior to the certain communication, wherein the method includes further delivering to the user a particular communication assistant service communication in dependence on processing of at least one historical point of view record of the second user generated prior to the certain communication instance based on one or more communication data stream of the second user during at least one historical communication of the second user, wherein the further delivering to the user is performed while the second user and the user are participating in the certain communication instance, wherein the extracting using natural language processing data relevant to a point of view of the user from the communication data stream includes extracting a topic of the communication data stream to provide an extracted topic of the communication data stream, and determining a sentiment of the user in regard to the extracted topic of the communication data stream, and wherein the determining a sentiment of the user in regard to the extracted topic has included processing historical data from at least one data source other than the communication data stream.

14. The system of claim 12, wherein the generating the at least one point of view record of the user includes generating at least one historical point of view record of the user prior to the certain communication instance involving the user and a second user, and wherein the processing of the stored at least one point of view record of the user includes processing the at least one historical point of view records of the user generated prior to the certain communication, wherein the extracting using natural language processing data relevant to a point of view of the user from the communication data stream includes extracting a topic of the communication data stream to provide an extracted topic of the communication data stream, and determining a sentiment of the user in regard to the extracted topic of the communication data stream, and wherein the delivering to the second user the communication assistant service communication includes delivering to the second user data indicating the sentiment of the user in regard to the extracted topic of the communication data stream, and wherein the determining a sentiment of the user in regard to the extracted topic has included processing historical data from at least one data source other than the communication data stream.

15. The system of claim 12, wherein the generating the at least one point of view record of the user includes generating at least one historical point of view record of the user prior to the certain communication instance involving the user and a second user, and wherein the processing of the stored at least one point of view record of the user includes processing the at least one historical point of view records of the user generated prior to the certain communication, wherein the extracting using natural language processing data relevant to a point of view of the user from the communication data stream includes extracting a topic of the communication data stream to provide an extracted topic of the communication data stream, and determining a sentiment of the user in regard to the extracted topic of the communication data stream.

16. The system of claim 12, wherein the generating the at least one point of view record of the user includes generating at least one historical point of view record of the user prior to the certain communication instance involving the user and a second user, and wherein the processing of the stored at least one point of view record of the user includes processing the at least one historical point of view records of the user generated prior to the certain communication, wherein the extracting using natural language processing data relevant to a point of view of the user from the communication data stream includes extracting a topic of the communication data stream to provide an extracted topic of the communication data stream, and determining a sentiment of the user in regard to the extracted topic of the communication data stream, and wherein the determining a sentiment of the user in regard to the extracted topic has included processing historical data from at least one data source other than the communication data stream.

17. The system of claim 12, wherein the generating the at least one point of view record of the user includes generating at least one historical point of view record of the user prior to the certain communication instance involving the user and a second user, and wherein the processing of the stored at least one point of view record of the user includes processing the at least one historical point of view records of the user generated prior to the certain communication, wherein the extracting using natural language processing data relevant to a point of view of the user from the communication data stream includes extracting a topic of the communication data stream to provide an extracted topic of the communication data stream, and determining a sentiment of the user in regard to the extracted topic of the communication data stream, and wherein the delivering to the second user the communication assistant service communication includes delivering to the second user data indicating the sentiment of the user in regard to the extracted topic of the communication data stream.

* * * * *